EXAMINER,
DIV. 3.
Specification out of print.
See resume on back.
F. Reuthe,
BEST AVAILABLE COPY
Jaw Trap,
No. 203, A.I. Patented July 6, 1858.
see original 17,297
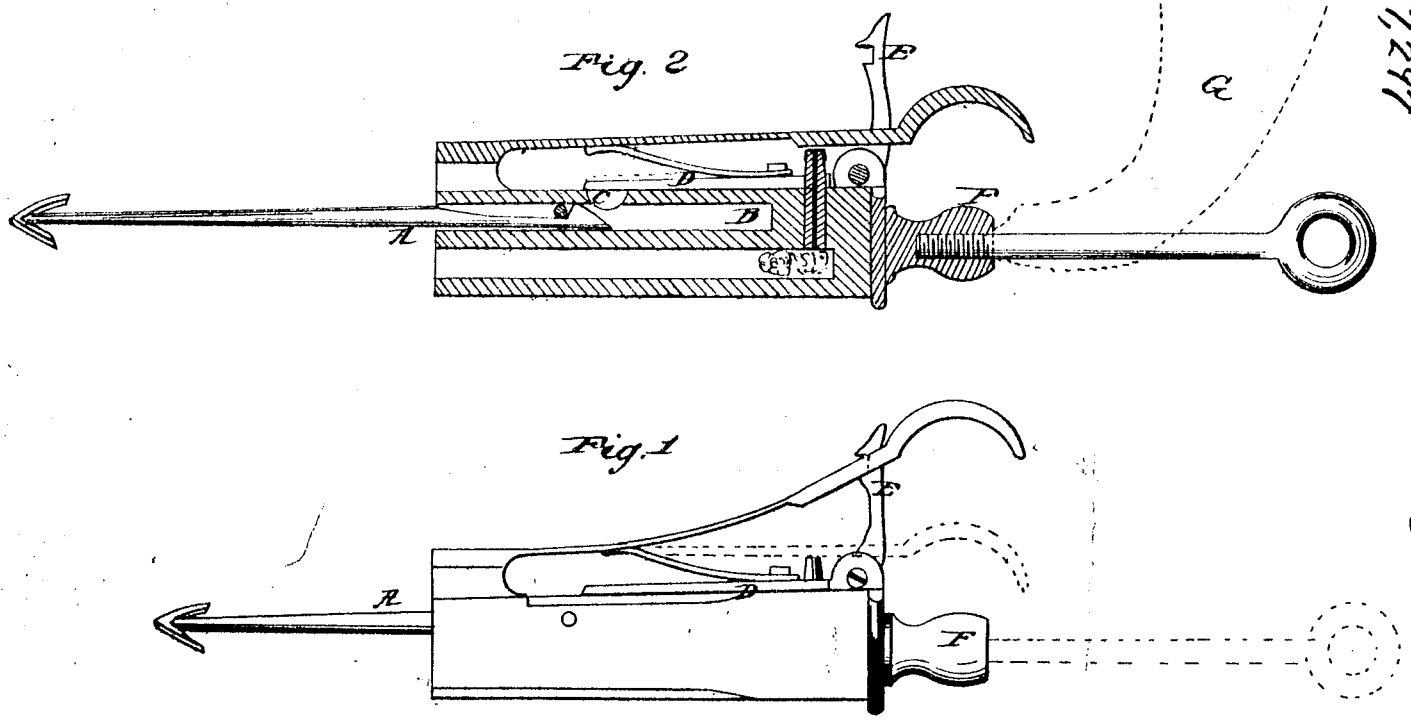
AM. PHOTO-LITHO. CO. N.Y. (OSBORNE'S PROCESS)

ADDITIONAL IMPROVEMENT ON PATENT NO. 17,297--MAY 12,1857

BEST AVAILABLE COPY

The nature of my improvements consists in the mode of constructing the trap with a solid slide for the bait and explosion in addition to the spring barbed fang as claimed in my old specification.

Fig. 1 is a side elevation of the trap and slide;
Fig. 2 is a section of the interior.

I make in the upper parb of the barrel of a single trap a slot or bore B for the bait slide A to work in. In a double-barreled trap the same kind of a bore is between the barrels as in the original design.

The sliding bait rod A is made solid, of the necessary size shape and strenghh and terminates at the outer end with a hook, barb, screw or any similar and appropriate devicefor retaining the bait and exploding the barrels when drawn out.

This is the improvement which I claim to be used instead of the spring barbed slide.

I also make a projection c on the lower part of the lever D to lift the same when the rod A is drawn out to throw back the trigger E to cause the same to explode barrels.

I also form the back or breech part of the trap so that a wire rod or hook can be screwed in to hang the trap by. And it will also be so arranged that a small trap can have a stock G similar to a pistol so that it can if required be converted into a pistol or manual fire arm.